United States Patent [19]

Gowda et al.

[11] Patent Number: 4,527,805
[45] Date of Patent: Jul. 9, 1985

[54] HIGH-PRESSURE FERROFLUID SEAL APPARATUS

[75] Inventors: Hanumaiah L. Gowda, Nashua; Kuldip Raj, Merrimack, both of N.H.

[73] Assignee: Ferrofluidics Corporation, Nashua, N.H.

[21] Appl. No.: 606,582

[22] Filed: May 3, 1984

[51] Int. Cl.$^3$ .............................. F16J 15/40
[52] U.S. Cl. ............................... 277/80; 277/135
[58] Field of Search .......................... 277/135, 80

[56] References Cited

FOREIGN PATENT DOCUMENTS

| 58-68554 | 4/1983 | Japan | 277/80 |
| 773353 | 10/1980 | U.S.S.R. | 277/80 |
| 875153 | 10/1981 | U.S.S.R. | 277/80 |

*Primary Examiner*—Robert I. Smith
*Attorney, Agent, or Firm*—Richard P. Crowley

[57] ABSTRACT

A high-pressure rotary seal apparatus with a radially-polarized permanent magnet, which seal apparatus comprises: a housing; a magnetically-permeable shaft to be sealed extending through the housing, the shaft characterized by a plurality of separate grooves or stages on the shaft; a radially-polarized permanent magnet extending about the shaft, at least one pole piece adjacent to and in a magnetic flux relationship with the radially-polarized permanent magnet and extending about the shaft, one polarized end of the polarized magnet and one end of the pole piece extending into a close, non-contacting relationship with the grooves on the surface of the shaft to form a plurality of separate radial gaps; ferrofluid disposed in the radial gaps to define a plurality of separate, spaced-apart ferrofluid O-ring seals about the surface of the shaft; and a generally cylindrical, magnetically-permeable keeper element extending about the other polarized end of the magnet and the other end of the pole piece in order to provide a magnetic flux circuit which extends between the radially-polarized magnet, the keeper element, the shaft, and the ferrofluid in the radial gaps.

10 Claims, 2 Drawing Figures

HIGH-PRESSURE FERROFLUID SEAL APPARATUS

BACKGROUND OF THE INVENTION

Ferrofluid seal apparatuses are known for sealing rotary shaft elements, such as for use as an exclusion-type seal or as a pressure capacity-type seal. Such ferrofluid seal apparatus provides an effective seal between different environments, either at the same or at different pressures or having the same or different environments.

U.S. Pat. No. 4,293,137, issued Oct. 6, 1981, relates to the use of a ferrofluid seal apparatus which comprises a single axial permanent magnet in the shape of a flat washer element surrounding a rotatable shaft; and which flat washer element captures ferrofluid on the inside or outside diameter of the washer element. The flat washer element provides a ferrofluid seal between a housing and the exterior surface of the washer element or between the interior surface of the washer element and a rotatable shaft surface. In addition, such axial polarized permanent magnets are also employed to seal hermetically on one or both sides of a ball bearing.

A multiple-stage pressure capacity-type ferrofluid seal apparatus is described, for example, in U.S. Pat. No. 3,620,584, issued Nov. 16, 1971, which patent describes a multiple-stage ferrofluid seal apparatus employing an annular permanent magnet and a plurality of separate spaced apart ferrofluid O-ring seals extending about the surface of the shaft element to be sealed, each seal providing its own defined pressure capactiy and employing two pole pieces, one on either side of the annular, axially polarized, permanent magnet.

In addition, magnetic bearing systems, such as a ball bearing, have been used to support a rotary shaft and to permit the low friction rotation thereof and have employed ferrolubricants retained with the confines of the inner and outer race of the ball bearing assembly, such as, for example, described in U.S. Pat. No. 3,977,739, issued Aug. 31, 1976.

British Pat. No. 783,881, published in October of 1957 relates to a magnetic seal wherein a plurality of axially stacked separate magnetic seals are placed about a rotary shaft to form a plurality of magnetic barriers or seals about the rotary shaft. The seal, so prepared, comprises a plurality of separately stacked, axially polarized, permanent magnets and separate pole pieces to form a multiple-stage, pressure capacity-type seal.

It is desirable to provide a pressure capacity-type ferrofluid seal apparatus which is more compact than conventional, mulitple-stage ferrofluid seal apparatus, and which seal apparatus may be constructed at lower cost with the use of lower magnetic energy product and yet have the same or substantially more pressure capacity, as required in the prior art ferrofluid seal apparatus.

SUMMARY OF THE INVENTION

The invention relates to a radially polarized multiple-stage ferrofluid seal apparatus and method, and more particularly to a high pressure, compact, radially polarized, multiple-stage ferrofluid seal apparatus and system wherein a magnetically permeable shaft has a plurality of separate grooves thereon, and wherein the magnetic flux circuit is completed through a keeper element within a nonmagnetically permeable housing.

The radially polarized, multiple-stage ferrofluid seal apparatus of the invention provides a compact, high pressure rotary seal with radially polarized magnet with single on one or dual pole pieces on both sides of the radially polarized magnet. The high pressure ferrofluid seal concentrates the magnetic flux and employs a plurality of grooves on the magnetically permeable shaft element to provide for a plurality of separate spaced-apart radial gaps to form a plurality of separate spaced-apart ferrofluid O-ring seals about the shaft element. The high pressure ferrofluid seal apparatus employs a generally cylindrical, magnetically permeable keeper element secured by static seals to the interior diameter of a nonmagnetically permeable housing and does not require that the bearing elements be magnetically permeable.

The high pressure ferrofluid seal apparatus thus provides for a magnetic flux circuit path which extends between the radially polarized magnet through one adjacent or two adjacent magnetically permeable pole pieces, a keeper element, ferrofluid in the radial gaps, and the magnetically permeable shaft; thus providing for a highly concentrated magnetic flux, providing for a higher pressure capacity per ferrofluid sealing stage, and which permits the use of nonmagnetically permeable housing such as aluminum and of nonmagnetically permeable rotary bearings, such as ball bearings; for example, of bronze.

The high pressure multiple-stage ferrofluid seal apparatus provides for significant advantages over prior art multiple-stage seal apparatus in that the seal apparatus has high magnetic efficiency, a short magnetic flux path, a reduction of flux leakage outside the seal, and which seal apparatus is compact in size, particularly in axial length, is easily manufactured at low cost, while permiting the selection of the housing to be magnetic or nonmagnetic and of the bearings to be magnetic or nonmagnetic.

The high pressure multiple-stage ferrofluid seal apparatus is particularly useful in the separation of first and second environment at different pressures, such as being useful as a vacuum rotary shaft seal, wherein there are subatmospheric pressures on one side and atmospheric or superatmospheric pressures on the other side of the ferrofluid seal.

The high pressure multiple-stage ferrofluid seal apparatus comprises a preferably nonmagnetically permeable housing through which passes a magnetically permeable rotary shaft element, the surface of which shaft element is to be sealed by the formation of a plurality of separate, spaced-apart ferrofluid O-ring seals. Preferably the housing is composed of a nonmagnetic material, however, a slightly magnetic permeable material may be used provided that the keeper element employed is of a higher magnetic saturation so as to concentrate the magnetic flux in the proper flux path. The surface of the shaft element is grooved so as to form a plurality of separate, spaced-apart grooves and/or knife edges with a radially polarized permanent magnet and a magnetically permeable pole piece on one side and typically adjacent to the radially polarized magnet and in direct contact therewith or on both sides of the radially polarized permanent magnet. One end of the radially polarized magnet and one end of the first or second pole pieces extends into a close, noncontacting relationship with the grooves and knife edges on the surface of the shaft so as to form a plurality of separate, spaced-apart radial gaps. The number of stages may be varied as desired depending on the desired pressure capacity of the seal. Typically, the high pressure ferrofluid seal apparatus provides for a pressure capacity of greater than 15 psi or more, such as, for example, 15 to 50 psi or higher depending on the number of stages, energy product of the magnet, the radial gap and the saturation magnetization value of the fluid.

The high pressure ferrofluid seal apparatus comprises a generally cylindrical keeper element composed of a magnetically permeable material which is placed adjacent to the other end of the radially polarized permanent magnet and the other end of the first and second pole pieces and typically in direct contacting relationship thereto and statically sealed against the interior wall surface of the nonmagnetically permeable housing. A nonmagnetically spacer element is used where required in order to insulate the magnetic seal system from other magnetically permeable elements, such as, for example, adjacent magnetically permeable bearing elements, such as magnetically permeable rotary bearing elements, such as ball bearings.

The high pressure ferrofluid seal apparatus includes a bearing element in order to provide support for the shaft element extending through the housing and, typically, a pair of rotary bearing elements, such as ball bearing elements, provide support for the shaft at each end of the housing. Where the bearing elements employed are magnetically permeable and are adjacent to the pole pieces or to the magnet, a nonmagnetic spacer element; for example, aluminum or plastic, is employed between the bearing elements and the keeper or the pole pieces or the radially polarized permanent magnet so as to provide the proper concentration and flux path of the magnetic flux. The magnetic flux path circuit of the high pressure seal apparatus thus passes between the radially polarized permanent magnet, the first and/or second pole pieces, the keeper elements surrounding the radially polarized permanent magnet and the pole pieces, the ferrofluid in the radial gaps, and the shaft element, thus providing for a compact, concentrated, magnetic flux path.

A variety of ferrofluid may be employed in the ferrofluid seal apparatus, such as a low volatility hydrocarbon or ester ferrofluid; for example, a ferrofluid having a viscosity of about 100 to 2000 cps and typically 100 to 1000 cps and a magnetic gauss of from about 100 to 1000; for example, 200 to 600 gauss.

The invention we described for the purposes of illustration only in connection with certain embodiments; however, it is recognized that those persons skilled in the art may make various changes, modifications, and improvements therein all falling within the spirit and scope of the invention.

DESCRIPTION OF THE EMBODIMENTS

Figure 1:
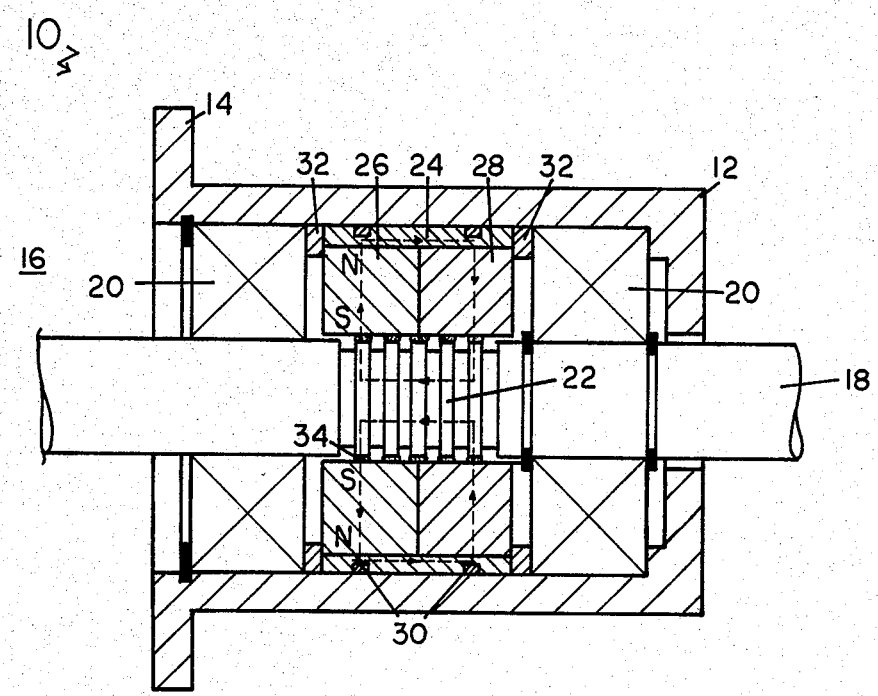
FIG. 1 is a schematic sectional illustration of a high pressure ferrofluid seal apparatus of the invention.

FIG. 1 illustrates a high pressure ferrofluid seal apparatus 10 which comprises a nonmagnetically permeable housing, such as, for example, of aluminum 12 having an extending flange element 14 which adapts such housing to be secured to, for example, a wall of a vaccum chamber 16 so that the ferrofluid seal apparatus 10 may provide for a high pressure capacity seal between atmospheric pressure and the subatmospheric pressure in the vacuum chamber 16. A magnetically permeable shaft element 18 extends through the housing 12 and one end extends into the vacuum chamber 16 and the other end is at atmospheric pressure and is adapted for rotary motion. The housing 12 includes a pair of magnetically permeable ball bearing elements 20 at either end of the housing to provide support for the rotary motion of the shaft 18. The shaft 18 has on its surface a series of separate, spaced-apart grooves to form knife edges 22 and to define a plurality of radial gaps at the outer edge thereof. The seal apparatus includes a magnetically permeable cylindrical keeper element. The cylindrical keeper element 24 is secured by static seals 30 to the interior wall surface of the nonmagnetically permeable housing 12.

The seal apparatus includes a radially polarized permanent magnet 26 and a magnetically permeable pole piece 28 directly adjacent and in magnetic flux contact with the radially polarized permanent magnet 26. The one end of the radially polarized magnet 26 and one end of the pole piece 28 extends into a close, noncontacting relationship with the grooves 22 in the surface of the shaft 18 to define a plurality of separate, spaced-apart ferrofluid O-ring seals about the surface of the shaft. The use of a ferrofluid 34 in each of the radial gaps can provide a defined pressure capacity for each stage of the multiple stage ferrofluid seal.

A nonmagnetically permeable annular spacer type material spaced at either end of the keeper element 24 is an insulator 32 intermediate between the bearings 20 and the magnetically permeable components of the seal 26 and 28 in order to isolate magnetically the bearings 20. Of course, if the bearings are nonmagnetically permeable then no spacer element 32 need be employed. The spacer element 32 provides for the concentration of the magnetic flux path as illustrated in FIG. 1 between the magnetically permeable magnet 26, the magnetically permeable keeper element 24, the magnetically permeable pole piece 28, the ferrofluid 34 in the radial gaps, and the shaft 18. This arrangement provides for a concentrated magnetic flux, provides for high pressure capacity of the seal, and compact ferrofluid seal apparatus. The magnetic flux circuit of FIG. 1 is illustrated by dotted lines in the drawing.

Figure 2:
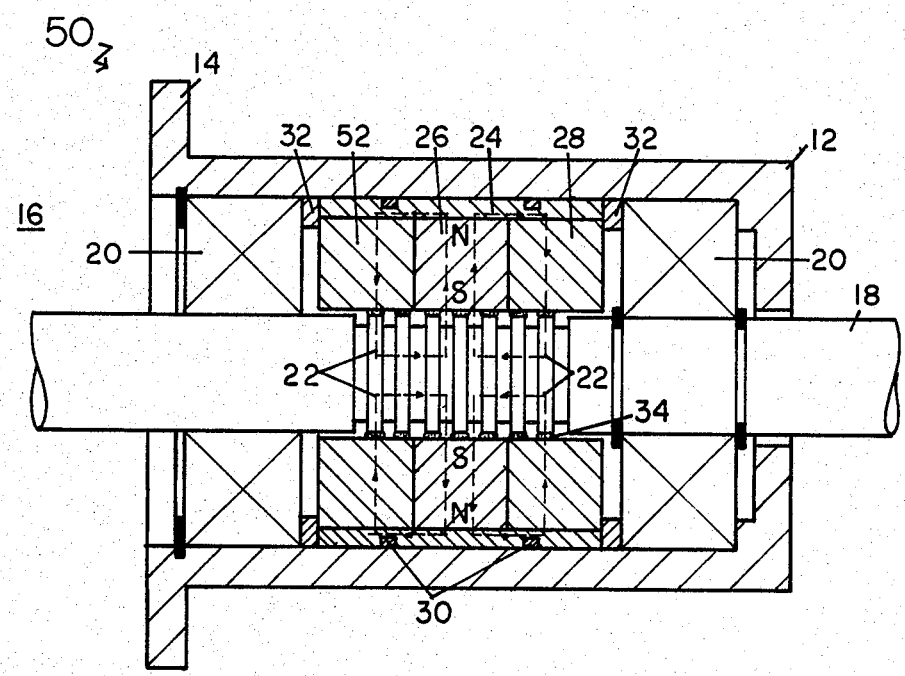
FIG. 2 is a schematic illustrative sectional view of another embodiment of the high pressure ferrofluid seal apparatus of the invention.

FIG. 2 shows a high pressure ferrofluid seal apparatus similar to FIG. 1 except that an additional adjacent pole piece 52 is employed and wherein the magnetic flux path is illustrated as extending between the radially polarized magnet 26 and each of the pole pieces 52 and 28. The employment of two pole pieces on either side of the radially polarized magnet permits the employment of more stages and, therefore, a higher pressure capactiy of the ferrofluid seal apparatus.

The high pressure ferrofluid seal apparatus as illustrated provides for a low cost, compact, high pressure ferrofluid seal for rotary shafts useful particularly in sealing shafts and where there is a difference in pressure across the multiple-stage ferrofluid seals.

What is claimed is:

1. A high pressure ferrofluid multiple-stage seal apparatus which comprises:
    (a) a housing;
    (b) a magnetically permeable shaft element to be sealed and extending within the housing, the shaft element having a plurality of separate spaced-apart edges thereon;
    (c) bearing means to support the shaft element;

(d) a radially polarized annular permanent magnet having a one and another end and surrounding the shaft element;

(e) a first magnetically permeable annular pole piece element having a one and another end and in a magnetic flux relationship with the radially polarized permanent magnet;

(f) the one end of the radially polarized permanent magnet and the one end of the first pole piece means extending into a close, noncontacting relationship with the edges on the surface of the shaft element to form a plurality of separate, spaced-apart radial gaps between the one end of the permanent magnet and the first pole piece element;

(g) a magnetically permeable keeper element disposed about and in a magnetic flux relationship with the other end of the radially polarized permanent magnet and the other end of the first pole piece element;

(h) ferrofluid retained in the radial gaps to form a plurality of separate O-ring ferrofluid seals about the surface of the shaft element to seal the shaft element; and (i) the magnetic flux circuit of the high pressure ferrofluid seal apparatus extending between the radially polarized permanent magnet, the keeper element, the shaft, the first pole piece, and the ferrofluid in the radial gaps.

2. The apparatus of claim 1 which includes a second magnetically permeable annular pole piece element, the radially polarized permanent magnet positioned between the first and second pole piece elements and in a magnetic flux relationship with the first and second pole piece elements, the second pole piece element having a one and another end and one end extending into a close noncontacting relationship with the grooves on the surface of the shaft to form a plurality of radial gaps between the surface of the second pole piece element and the shaft; thereby providing a plurality of O-ring ferrofluid seals about the surface of the shaft element beneath the one end of the first and second pole piece elements and the magnet.

3. The apparatus of claim 1 wherein the bearing means comprises rotary bearing means on either side of the radially polarized permanent means.

4. The apparatus of claim 3 wherein the bearing means comprises a magnetically-permeable rotary bearing means and which apparatus includes a nonmagnetic spacer means extending between the magnetically permeable bearing means and the first pole piece element and the permanent magnet to insulate magnetically the bearing means from the permanent magnet and the pole piece.

5. The apparatus of claim 1 wherein the keeper element comprises a cylindrical keeper element sealingly secured to the internal surface of the housing and placed in direct contact with the other end of the radially polarized permanent magnet and the other end of the first pole piece element.

6. The apparatus of claim 1 wherein the ferrofluid comprises a viscosity of about 100 to 2000 cps and has a magnetic gauss of from about 100 to 1000 gauss.

7. The apparatus of claim 1 wherein the housing is a nonmagnetically permeable housing.

8. A high pressure multiple-stage ferrofluid seal apparatus which comprises:

(a) a housing having an internal wall surface;

(b) a magnetically permeable shaft element to be sealed and extending through the housing, the shaft element characterized by a plurality of spaced-apart, raised peripherial edges on the shaft element, (c) a magnetically permeable rotary bearing means to support the shaft element at either end of the housing;

(d) a radially polarized annular permanent magnet having a one and the other end and surrounding the shaft element;

(e) a magnetically permeable annular first pole piece means having a one and another end and in direct contact and adjacent to the radially polarized permanent magnet;

(f) the one end of the radially polarized permanent magnet and the one end of the first pole piece means extending into a close, noncontacting relationship with grooves on the surface of the shaft element to form a plurality of radial gaps between the said one ends and the edges of the shaft;

(g) a magnetically permeable cylinderical keeper element secured to the internal surface of the nonmagnetically permeable housing and extending about, and in a magnetic flux relationship with the other end of the radially polarized permanent magnet and the other end of the first pole piece element;

(h) ferrofluid retained in the radial gaps to form a plurality of spaced-apart pressure capacity type O-ring ferrofluid seals about the surface of the shaft element;

(i) nonmagnetically permeable annular spacer means between the magnetically permeable bearing means and the radially polarized permanent magnet and the first pole piece element to insulate magnetically the bearing means; and (j) the magnetic flux circuit extending between the permanent magnet, the first pole piece element, the keeper element, the shaft, and the ferrofluid in the radial gaps.

9. The apparatus of claim 8 which apparatus includes a second pole piece element, the radially polarized permanent magnet positioned between the first and second pole piece elements and in a magnetic flux relationship with the first and second pole piece elements, the second pole piece element having a one and another end and one end extending into a close noncontacting relationship with the edges on the surface of the shaft to form a plurality of radial gaps between the surface of the second pole piece element and the shaft; thereby providing a plurality of O-ring ferrofluid seals about the surface of the shaft element beneath the first and second pole piece elements and the magnet.

10. The apparatus of claim 1 wherein the housing comprises a magnetically permeable housing material and said keeper element comprises a magnetically permeable material of higher magnetic saturation than the housing material to concentrate the magnetic flux through the keeper element in the magnet flux circuit.

* * * * *